Jan. 7, 1958 R. Q. SKRMETTA 2,818,598
OYSTER SHUCKING MACHINE
Filed Feb. 16, 1956 6 Sheets-Sheet 1
Fig. 1
Fig. 11
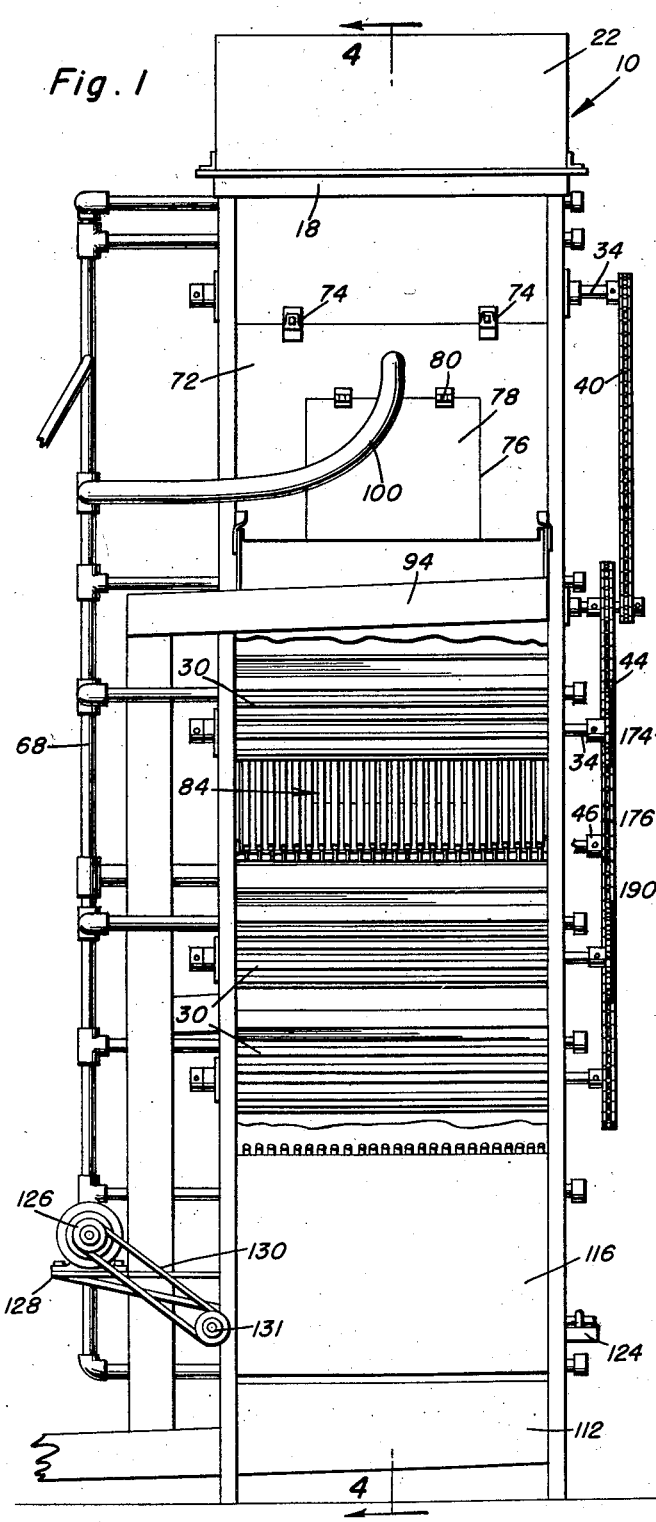
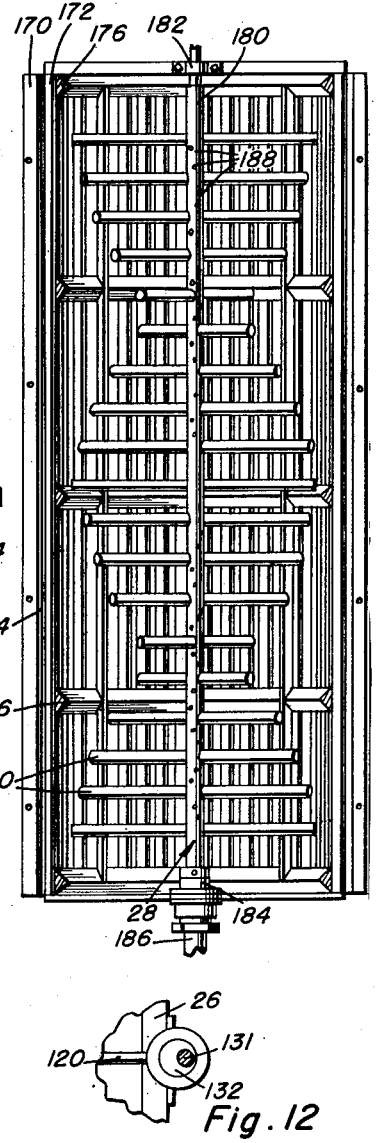
Fig. 12
Raphael Q. Skrmetta
INVENTOR.
BY *Clarence A. O'Brien*
*and Harvey B. Jacobson*
Attorneys

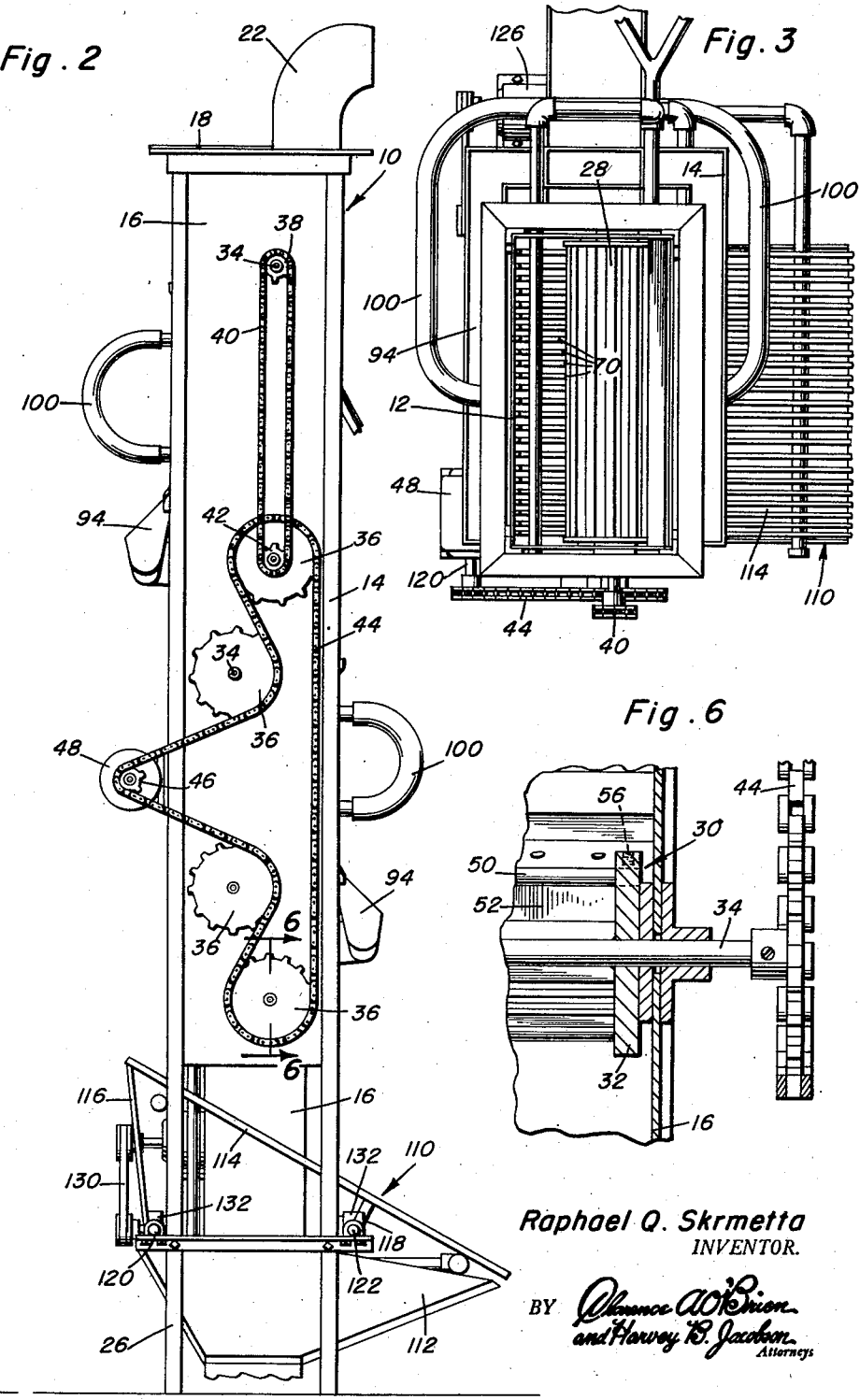
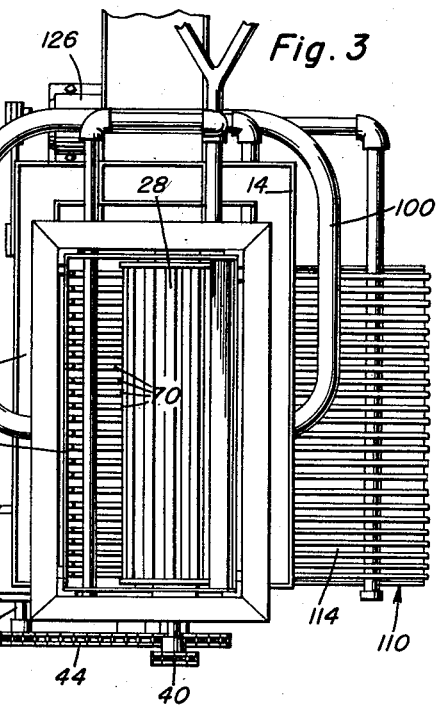
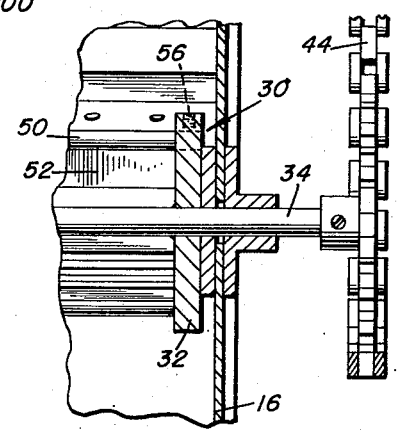
Fig. 2
Fig. 3
Fig. 6
Raphael Q. Skrmetta
INVENTOR.

Jan. 7, 1958    R. Q. SKRMETTA    2,818,598
OYSTER SHUCKING MACHINE
Filed Feb. 16, 1956    6 Sheets-Sheet 3

Raphael Q. Skrmetta
INVENTOR.

Jan. 7, 1958 R. Q. SKRMETTA 2,818,598
OYSTER SHUCKING MACHINE
Filed Feb. 16, 1956 6 Sheets-Sheet 4
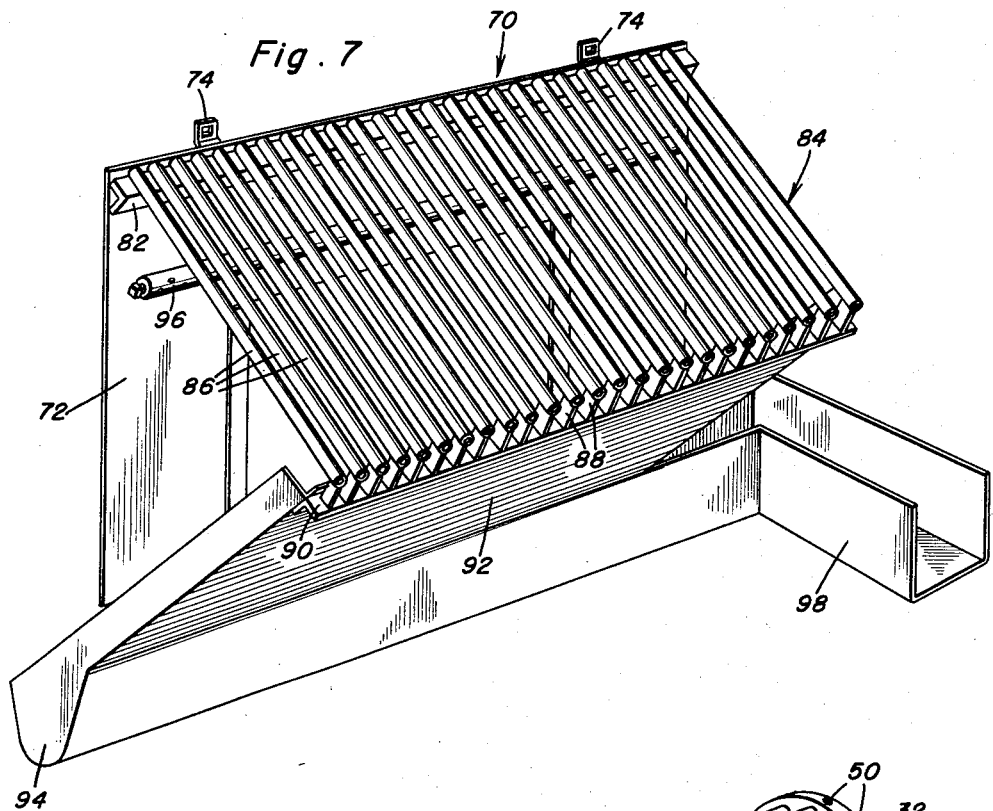
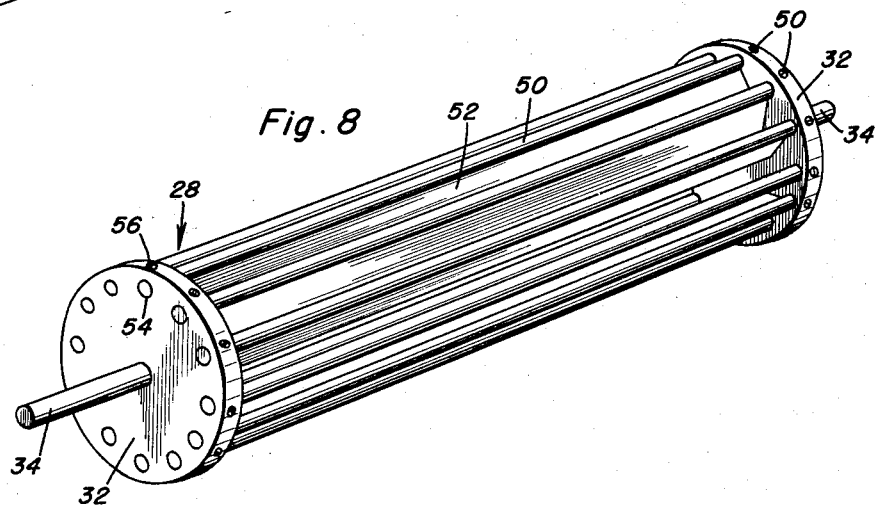
Raphael Q. Skrmetta
INVENTOR.

Jan. 7, 1958    R. Q. SKRMETTA    2,818,598
OYSTER SHUCKING MACHINE
Filed Feb. 16, 1956    6 Sheets-Sheet 5

Raphael Q. Skrmetta
INVENTOR.

BY *[signatures]*
Attorneys

Jan. 7, 1958 R. Q. SKRMETTA 2,818,598
OYSTER SHUCKING MACHINE
Filed Feb. 16, 1956 6 Sheets-Sheet 6

Raphael Q. Skrmetta
INVENTOR.

BY
Attorneys

United States Patent Office 2,818,598
Patented Jan. 7, 1958

2,818,598

OYSTER SHUCKING MACHINE

Raphael Q. Skrmetta, New Orleans, La.

Application February 16, 1956, Serial No. 565,916

20 Claims. (Cl. 17—9)

This invention comprises novel and useful improvements in an oyster shucking machine and more particularly relates to an apparatus and a method for shucking oysters in a greatly improved manner.

The primary object of this invention is to provide an apparatus and a method whereby oysters which have been previously opened by steaming or the like may be effectively shucked, the meat dislodged from and separated from the shells in an improved manner, with a substantial reduction or complete elimination of damage of the meat by contact with the shells.

A further object of the invention is to provide an apparatus and method whereby the shucking may be effected by a single passage or run of the oysters through a plurality of impact members which serve to dislodge the meat from the shells.

A further object of the invention is to provide an apparatus and a method whereby oysters may be shucked with a greater efficiency and a less damage of the meat of the oysters by a single free fall of the oysters through a vertical passage means, and especially without any substantial reversal of unidirectional travel of the oysters through the passage.

A broad purpose of the invention is to provide an apparatus and method whereby oysters may be caused to move along an elongated path of travel with a substantially non-reversing travel therealong, and whereby a zig-zag or transverse motion of the oysters relative to the path of travel may be effected, abrupt movement being applied to the oysters for shaking or dislodging the meat from the shells thereof, and all this during a single course or passage of the oysters along the non-reversible path of travel.

Yet another object of the invention is to provide an apparatus and method whereby oysters during a non-reversing path of movement are subjected to a plurality of transversely directed movements for dislodging the meat from the shells; and whereby the dislodged meat is immediately separated from the shells after each such transverse movement, whereby to prevent contamination of the meat and damage of the meat by the shells such as would result by requiring the dislodged meat to pass with the shells throughout the entire course of travel through the apparatus.

A further object of the invention is to provide an apparatus and a method whereby the separating of the meat and the shells is facilitated by agitation of the separating means; and/or by the applying of sprays of water to the means causing the transverse movements of the oysters during their movement along the path of travel.

A further important object of the invention is to provide an apparatus and a method whereby oysters during a single passage along a path of travel, and especially whereby oysters during a single vertical fall by gravity along a vertical path of travel may be subjected to a plurality of transversely, laterally directed impulses for dislodging the meats from the shells.

A further object of the invention is to provide an apparatus and method in accordance with the immediately preceding object wherein the frequency of the impulses, and the force of the same may be easily regulated and controlled in order to adapt the apparatus and process to accommodate different types and sizes of oysters most effectively.

Yet another purpose of the invention is to provide an improved oyster and shell separating means which will effectively separate the oyster meat dislodged from the shells; and whereby the separator means may be readily removed from the apparatus for servicing, or for replacement with a different size of separator.

A still further purpose of this invention is to provide an oyster shucking machine in accordance with the foregoing objects which will greatly reduce the area of floor space heretofore required by oyster shucking apparatus such as those of the tumbling barrel type and will secure a much greater capacity for shucking oysters with a reduced requirement for floor space.

An additional object is to provide a machine conforming to the preceding objects whereby opened oyster shells may be passed successively through a plurality of oyster agitating stations, in each of which one or more impacts, subject to precise regulations as to force, frequency and/or direction may be given to the shells for dislodging and receiving the meat therefrom.

And a final important object of the invention to be specifically enumerated herein is to provide an oyster shucking machine wherein to some extent the oyster meats are simultaneously shucked and graded.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear elevational view, parts being broken away, showing one suitable form of apparatus in accordance with the principles of this invention and for carrying out the method of this invention;

Figure 2 is an end elevational view of the apparatus of Figure 1, taken from the right end thereof and showing in particular the driving means for various instrumentalities and sub-assemblies of the apparatus;

Figure 3 is a top plan view, parts being broken away, of the arrangement of Figures 1 and 2, the cover and the inlet duct being removed from the apparatus;

Figure 4:
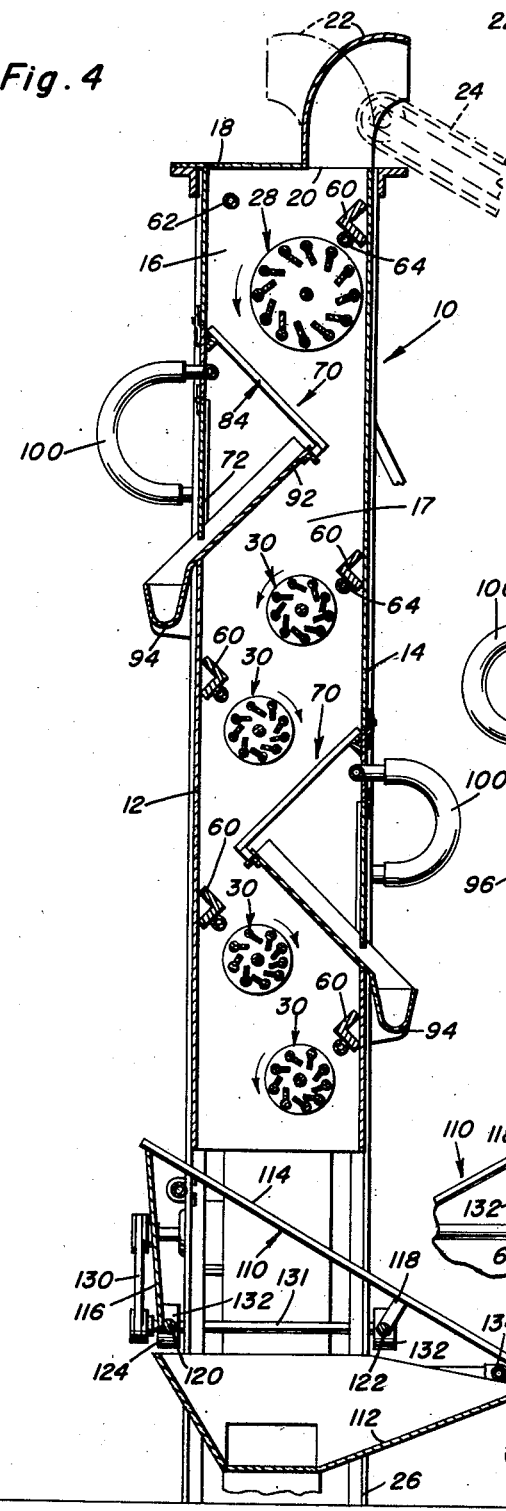
Figure 5:
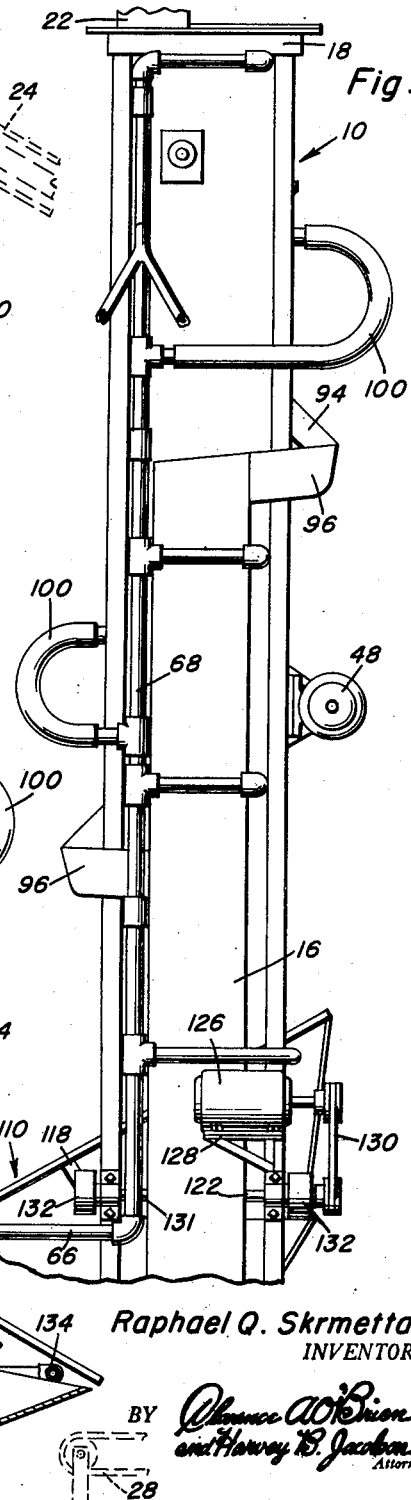
Figure 9:
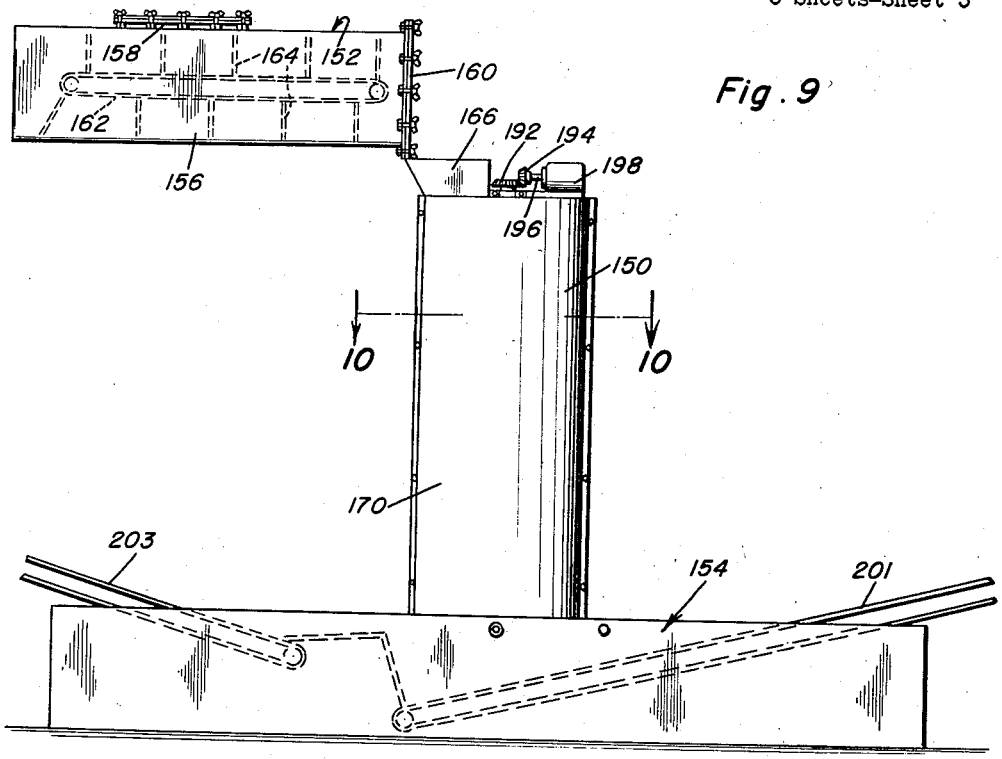
Figure 10:
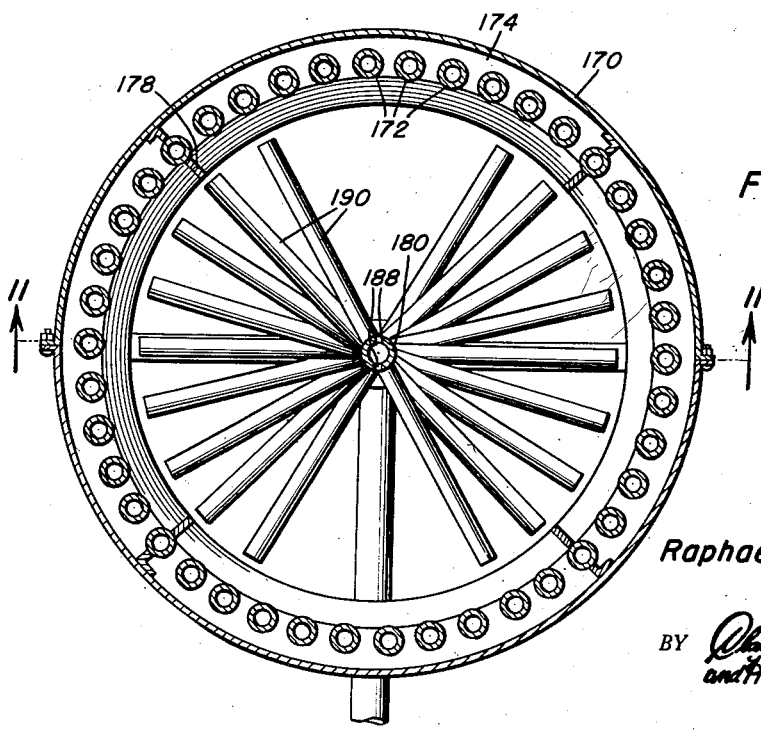

Figure 4 is a vertical central transverse sectional view taken substantially upon the plane indicated by the section line 4—4 of Figure 1 and showing the internal arrangement of the apparatus and the plurality of means for applying abrupt transverse movements to the oysters during their fall through the apparatus, certain conveyors for supplying oysters to the apparatus and for removing the shells therefrom being shown in dotted lines therein;

Figure 5 is a view similar to Figure 2 but taken from the other or left end of the apparatus of Figure 1, parts being broken away;

Figure 6 is a detailed view taken upon an enlarged scale substantially upon the plane indicated by the section line 6—6 of Figure 2 and showing a portion of the structure of and the manner for driving one of the means causing transverse movement of the oysters during their travel along the elongated path through the apparatus;

Figure 7 is a perspective view on an enlarged scale of a removable closure of the apparatus carrying as a sub-assembly therewith one of the separator gratings and an oyster meat removal chute;

Figure 8 is a perspective view on an enlarged scale of one of the plurality of reels or rotary beaters for causing transverse movement of the oysters during their fall through the apparatus;

Figure 9 is a side elevational view showing a second embodiment of oyster shucking machine carrying out the principles and the method of this invention, certain concealed parts being shown in dotted lines therein;

Figure 10 is a horizontal sectional view taken on an enlarged scale substantially upon the plane indicated by the section line 10—10 of Figure 9 and showing certain details of the internal construction of the oyster shucker.

Figure 13:
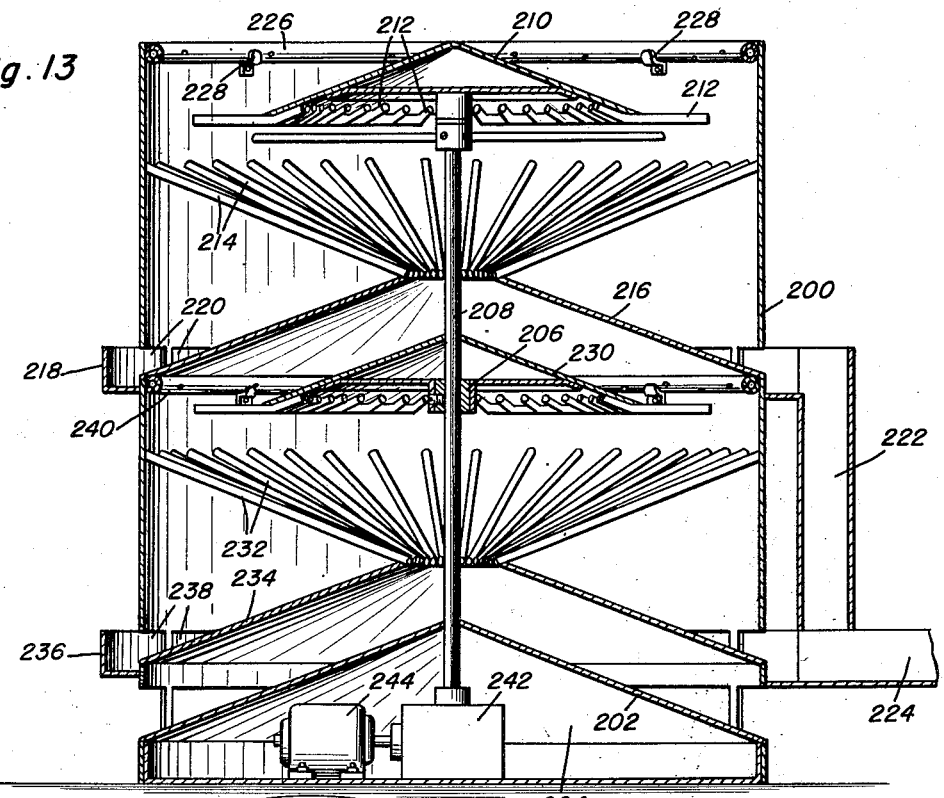
Figure 14:
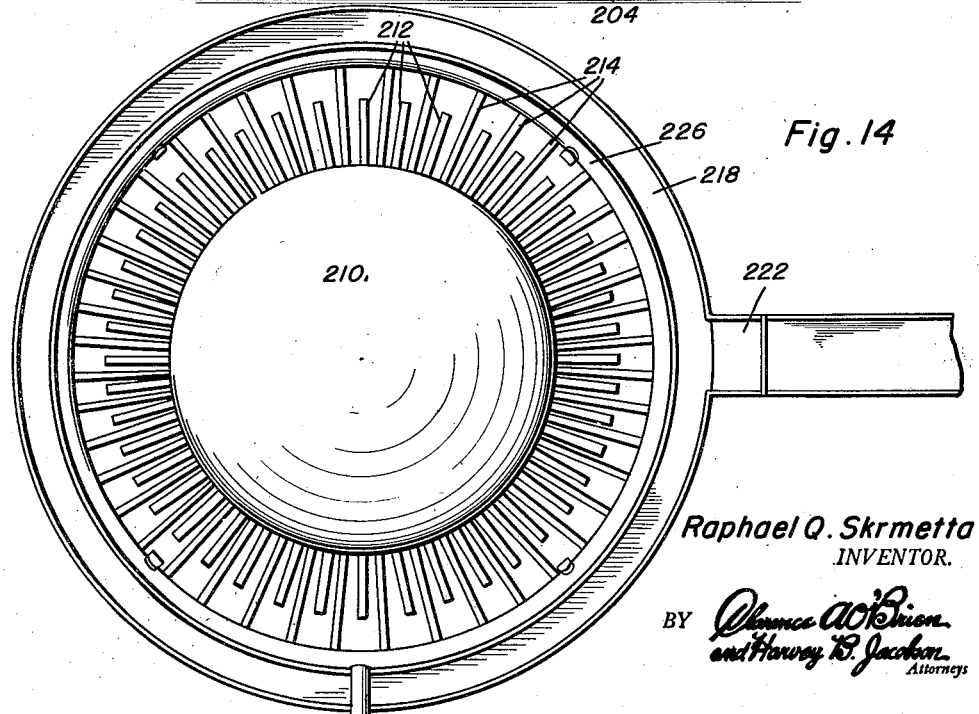

Figure 11 is a vertical central sectional view on a reduced scale and is taken substantially upon the plane indicated by the section line 11—11 of Figure 10; and Figure 12 is a detail fragmentary view partly in section of one of the eccentrics of the vibrating mechanism for shaking the lowermost separator grating;

Figure 13 is a view in central vertical sectional view, partly broken away of a further modified embodiment of the oyster shucker in accordance with this invention and operating upon the method thereof; and Figure 14 is a top plan view, partly broken away, of the apparatus of Figure 13.

*Apparatus of Figures 1–8*

In order to illustrate the principles of the invention there is disclosed in Figures 1–8 one suitable form of apparatus, constituting a preferred form of apparatus and which operates in accordance with the novel method of this invention.

The apparatus illustrated consists of a vertically extending, tower-like structure indicated generally by the numeral 10 and which constitutes a support for and a housing for the various instrumentalities to be hereinafter set forth. It is understood that this structure will be of suitable size and material in accordance with the particular conditions under which it is adapted to operate. As illustrated, the structure consists of vertically extending front and back walls 14 and 12, together with end walls 16, and which preferably provide a single vertically extending chamber 17 therebetween. A suitable top or closure plate 18 may be provided for the top of this chamber, the same having an opening 20 constituting an inlet opening to which there is connected a hood or chute 22 adapted to constitute the means by which oysters already opened as by steaming or the like are fed into the top of the shucking apparatus. Preferably, as will be seen by comparing the full and dotted line showings of the member 22 of Figure 4, the position of the inlet hood 22 is reversible whereby the shucked oysters may be discharged thereinto as by a feed conveyor indicated generally by the numeral 24 from either the front or the rear side of the machine in accordance with the dictates of expediency.

At its lower end, the structure 10 is preferably mounted upon suitable supporting legs 26 and there is associated therewith, as shown in dotted lines in Figure 4, a suitable discharge conveyor 28 whereby the oyster shells from which the meat has been shucked is removed from the apparatus.

Continuing to refer primarily to Figure 4 it will be seen that the apparatus 10 has a vertically disposed chamber forming a passage or tunnel through which the oysters, discharged by the feed conveyor 24, fall slowly under the influence of gravity from the top to the bottom end of the same. It should be particularly noted that the height of this vertical passage is such that a single, non-reversing, and substantially continuous fall of the oysters therethrough is sufficient to completely remove all of the meat from the shells and to separate the meat from the shells, as set forth hereinafter. In this embodiment of apparatus, movement of the opened oysters through the shucking chamber of the apparatus 10 is effected by the influence of gravity. It should, however, be specifically noted that this apparatus and the method forming the subject of this invention does not rely upon the force of gravity as the means for dislodging the meat from the oyster shells and for shucking the oysters, since the force and effectiveness of the shucking operation is totally independent of the force and rate of the gravity fall of the oysters. Instead, special provision is made for regulating and controlling the force of and the frequency of impacts applied to the falling oysters and whereby they are repeatedly thrown transversely of their vertical path of fall in order to effect the removal of the dislodgement of the oyster meats from their shells.

Further, it should be especially noted that each time the oysters are directed transversely of their vertical fall, provision is made for separating any of the extracted meats from the mass of shells, and removing the meat from the path of travel of the shells whereby the extracted meat is immediately removed from the path of the fall of the oysters and whereby any contact of this extracted meat with the oyster shells, and which contact might result in damage to the meat, is completely avoided. Thus, a much superior product is provided by the present apparatus from that of known prior practice wherein the extracted meats and the shells were necessarily kept and retained in contact with each other throughout the entire passage of both meat and shells through the shucking apparatus.

The principle by which this embodiment of the present invention extracts the meat from the oyster shells is the utilization of a plurality of laterally or horizontally directed impacts upon the falling oysters. For that purpose there is provided an upper rotor 28 with which may be associated one or more lower rotors 30. The upper rotor 28 is of considerably larger diameter than that of the lower rotors, but is of the same identical construction, and consequently the rotor construction shown in Figure 8 will be sufficient to enable an understanding of the construction and operation of each of the rotors.

The rotors 28 and 30 are preferably constructed in the form of reels. Thus, each rotor comprises a pair of end plates 32 from which projects on opposite sides of the reel an axially extending supporting and driving axle 34.

Each of the rotors 28 and 30 is disposed within the vertical chamber or tunnel of the apparatus and suitable means are provided for journaling the same for rotation about a horizontal axis extending through the axle 34. Preferably, however, one end of this axle is caused to extend or project through one of the end walls 16 to the exterior thereof, for the reception of a plurality of gears 36, see Figures 1 and 2, and a sprocket or gear 38 secured to the axle of the rotor 28, whereby rotation may be imparted to the plurality of vertically spaced rotors.

Referring now especially to Figures 1 and 2, it will be seen that a sprocket chain 40 is entrained over the sprocket 38 of the rotor 28, and over a sprocket 42 on the uppermost of the rotors 30. A further sprocket chain 44 is then entrained over each of the sprockets 36 on the projecting axles of each of the rotors 30, and over a driving sprocket 46 driven by any suitable power source such as a motor 48 which may conveniently be mounted upon the side of the back wall 14 of the structure 10. It will thus be seen that the motor 48 serves to impart rotation simultaneously to all of the rotors.

Referring again to Figure 8 it will be seen that each of the rotors 28 or 30 has secured between the two end plates or disks 32 a plurality of parallel, horizontal rods 50, each of which carries a radially projecting blade 52. The elongated blades thus extend with their rods between the two end plates 32 of each rotor and the rods 50 are disposed in circumferentially spaced position about and parallel to the central axle 34 of the reel. To receive the rods, each of the end plates of the reel is provided with axially extending bores 54 in which the ends of the rods are received, and radially projecting set screws 56 formed in the periphery of the disks serve to clamp and retain the ends of the rods in these bores in fixed position. The arrangement is such that the blades which are fixed to the rods may be rotated therewith about the axis of the rods in order to cause the blades to assume any desired adjusted position.

It will be observed from Figure 4 that these blades are not directed radially of the axis of the shaft 34 which is the axis of rotation of the reels, but instead are disposed at an angular position with respect thereto. By varying the angular disposition of these blades with respect to the radial planes through their axes of rotation, it is evident that the impact given by a blade upon the oysters falling vertically through the vertical chamber of the apparatus where they will be struck by the revolving blades may be varied or adjusted. It will be appreciated that the angular relation of the blades, as viewed in Figure 4 can be readily varied to suit different conditions. Preferably, however, the blades are secured in such angular position upon the disks 32 that when they impact against the falling oysters as the latter drop upon the top of the rotor, the direction of thrust imparted by the blades to the oysters will urge the same transversely of their vertical fall of travel, or transversely downwardly thereof. For that purpose, the blades should be in a vertical position at the time they impact the falling oysters, or in a position slightly inclined with respect to the vertical, in order to drive the oysters transversely and downwardly.

It will be apparent that by varying this angular relation of the blades, that the oysters may be caused to travel horizontally with respect to their vertical fall; or may be driven horizontally and downwardly at a varying angular inclination with respect to the vertical as may be desired. It is preferred to so position the blades that the oysters will in no event be directed upwardly, since this would tend to cause the meats dislodged from the shells to again fall into the rotor or into the other or the same oyster shells and thus risk damaging the dislodged and extracted meat by further contact of the same with the shells or with the rotor.

It will also be observed that by placing the upper rotor 28 closely adjacent the inlet opening 20, that there will be relatively little downward force to the falling oysters, so that substantially the entire impact to which the oysters are subjected for the purpose of dislodging or extracting the meat from the shells will be that created by the velocity or force of the blades 52 as they strike the falling oysters. As will now be apparent the falling oysters may be subjected to the action of any desired number of rotors 30 after their initial impact with the upper rotor 28, whereby the successive impacts of the rotors upon the falling oyster shells will effectively and thoroughly agitate and jar and dislodge and extract the oyster meat therefrom.

The vertical spacing of the series of rotors will be such that the oysters will fall by a series of gentle steps, and with no appreciable accelerated velocity of descent being acquired, so that the total impact force applied to the oysters during their traverse of the vertical shucking chamber will be solely that of the series of rotors, and thus permit accurate and precise control of the force of all of the impacts applied to the oysters.

It is evident that the size of the rotors, as well as the lateral and vertical spacing of the same with respect to each other and to the walls of the chamber to which the oysters fall, can be readily varied within the principles of this invention as dictated by expediency.

In order to more effectively direct the stream of falling oysters upon the rotors, there are provided a series of baffle members consisting of horizontally extending angle iron members 60 which are secured to the front and rear walls of the chamber, in proper position for deflecting the oysters effectively onto the next immediately succeeding rotor unit.

In order to assist in extracting the meat from the shells, and for cleansing the impact members of the rotors from any meat tending to adhere thereto, there are provided a plurality of horizontally extending spray manifolds 62 with their orifices directed towards the rotor unit immediately therebeneath. Conveniently, one set of spray manifolds 62 may be located adjacent the top of the chamber and across the chamber from the upper rotor 28 for directing a spray downwardly thereon, while the remainder of the manifolds 64 may be each carried beneath one of the baffle members 60, in close proximity to the rotor unit adjacent thereto for spraying the same. As will be apparent from Figure 5, water from any suitable source may be supplied as by a conduit 66 and a vertical supply pipe 68 to each of the spray manifolds 62 and 64.

An important feature of this invention is the provision of a separator cooperating with the rotor units for separating the meat extracted by the shells from the rotors, and removing this meat from further travel through the vertical chamber. For this purpose there are provided one or more separators each indicated generally by the numeral 70, one of which is shown in detail in Figure 7. Thus there is provided an upper separator disposed immediately below the upper rotor 28, and a lower separator disposed intermediate some of the smaller rotors 30. In accordance with the present invention this separator is of an improved and novel construction and is so constructed and associated with the structure 10 that the separator units may be individually easily removed therefrom, and may be interchanged with units having a different size to thus readily adjust and adapt the separators to handling different sizes of oysters.

Referring particularly to Figures 1, 4 and 7, it will be seen that each separator-unit includes a vertical panel 72 which at its upper end is provided with hanger brackets 74 whereby the panel 72 constitutes a removable closure for an opening formed in the front and rear walls 12 and 14 of the structure 10. It will thus be apparent that a panel 72 may be removed and interchanged with another panel carrying a different size of separator grating thereon as set forth hereinafter. Each of the panels is also provided with an opening 76 therein with which there is associated a closure door 78, hingedly secured thereon by hanger brackets 80 as shown in Figure 1.

Referring again particularly to Figure 7 it will be seen that the panel 72 at its upper edge is provided with a horizontally extending angle iron member 82 which is welded or otherwise rigidly secured thereto. A grating assembly indicated generally by the numeral 84 has its upper end rigidly secured to the member 82 and inclines inwardly and downwardly therefrom, and comprises preferably a plurality of rods 86 of a suitable size and spacing to provide a grating having the desired characteristics. The upper ends of these rods are preferably welded to the member 82, while their lower ends are preferably secured to lugs 88 which in turn are carried by an angle iron transversely extending member 90. The members 82, 86, 88 and 90 thus constitute a rigid grate having a predetermined spacing between its grate rods or bars.

The member 90 in turn is fixedly secured to the upper end of an inclined panel 92 constituting a chute or slide. The lower end of the latter extends through the opening and ends in a horizontally extending trough 94 lying across the vertical front or back wall of the apparatus.

As will now be understood by a comparison of Figures 7 and 4, the panel 72, the grating 84 and the trough 92 constitute a unitary assembly which is interchangeably and removably secured to the front or rear wall of the structure 10, with the grating and slide or chute upon the interior of the device and the trough 94 upon the exterior thereof. Also carried by the panel 72 adjacent the upper end thereof and below the upper end of the grating is a horizontally disposed spray manifold 96 which is adapted to spray water upon the grate bars 86 and also more particularly upon the chute or slide 92 to facilitate passage of the oyster meats passing through the grate bars down the slide to the trough 94, and from the trough 94 through the discharge channel 98.

The two channels 98 may deliver to a common trough whereby the oyster meats discharged through the front and rear walls of the structure 10 may be collected and delivered to any suitable place for collection and/or further treatment as desired.

As shown best in Figures 1, 4 and 5, flexible conduits 100 serve to connect the manifold spray members 96 carried by the panel 72 with the water main 68. When it is desired to remove a separator unit, it is merely necessary to disconnect the appropriate flexible hose 100, whereupon the separator unit may be lifted from its hinges 74 and readily removed from the structure 10.

Referring now specifically to Figure 4 it will be seen that as so far described opened oysters falling from the opening 20 will be directed by the uppermost baffle 60 directly upon the upper rotor 28 which is disposed adjacent the front wall 14. These oysters will then be driven towards the rear wall 12 or transversely of their vertical direction of fall, and will either impinge upon the wall 12 or upon the separator grate 84. In any event, any meats dislodged from the shells by the impact of the blades of the upper rotor 28, or which are removed from the shells by the fall of the same upon the upper grating 84, will fall through the grate rod 86 of the latter, and will be washed down the discharge chute or slide 92 by the water from the manifold 96, will be removed to the exterior of the shucking chamber and collected in the trough 94. The shells from which the meat has been dislodged and any of the shells which still retain the meat will then slide down the grating 84 of the upper separator unit 70, to the rear side of the vertical tunnel, and will strike the second deflector 60 and from thence be thrown into the next adjacent rotor unit 30. This in turn will throw the oysters across the tunnel towards the front wall, and the next baffle 60 will direct the oysters back into the next rotor 60 where the oysters will be again thrown towards the rear wall, and upon the second separator unit 70. Here the separating action will be repeated, the dislodged meats being separated from the shells and removed through the troughs 94, while the empty shells or those shells which still contain meat will again be directed by the succeeding baffles 60 to the next succeeding rotor units 30 where they will be again impacted. Below the open bottom end of the vertical passage through the shucking machine is disposed a lowermost separating grating 110. This grating is inclined downwardly and from the rear towards the front wall of the apparatus and serves primarily as a means for discharging the emptied oyster shells onto the discharge conveyor 28, although any final, relative small portion of meat which has previously remained in the shells and is extracted by the last set of rotor units will pass through this grating into a collecting hopper 112 for removal in any suitable manner from the apparatus.

Referring now to Figures 1, 2, 4 and 5 it will be seen that the separator grating 110 consists of a plurality of parallel downwardly inclined grating rods 114 whose opposite ends project beyond the front and rear walls of the apparatus. The upper ends of the rods project the rear wall 12 and are fixedly secured as by welding to the upper end of a panel 116. Where their lower ends project through the front wall 14, the grating rods are secured to members 118. The lower ends of the members 116 and 118 are fixedly secured to horizontally extending rods or shafts 120 and 122 which are mounted in suitable bearing assemblies 124 which permit both axial and oscillatory motion.

By means of an electric motor 126 mounted upon a suitable supporting platform 128 and driving belt 130, the lay shaft 131 is rotated. Eccentrics 132, associated with the shaft 131 are connected to the shaft 120, 122 to cause an axial movement thereof and a transverse agitation, vibration, or shaking action to the separator grating 110 through the members 116, 118. A spray manifold 134 is carried by the header 68 and disposed between the lower end of the grating 110 and the collection hopper 112 for washing any oyster meat passing through the grating 110 downwardly to the hopper where the same may be removed as desired.

It is to be understood that although the agitating means has been shown for convenience of illustration as being applied only to the lowermost separator grating 110, the same or other suitable agitating means can be provided to each of the grating assemblies 84 of the separator unit 70. As will be understood, the shells from the grating 110 are discharged upon and removed by the conveyor 28.

It is within the scope of this invention to so position the blades 52 that they will extend inwardly or outwardly of the circumference of the end plates 32, or both. Further, the blades may be permanently, fixedly secured in a predetermined position on the end plates, although it is preferred to have them adjustable, as above set forth, since the ease of adjustability of the blade angle is considered desirable as different sizes and conditions of the oysters being shucked may require various angles of blade impact for securing optimum efficiency.

A particularly important feature of this invention is that the relative speeds of the rotors 28 or 30 may be readily changed by suitably altering the gear rotors of the drive gearing. By way of example, the heavier and fatter cultivated oysters may require a different speed of rotation of the reels than do the natural oysters.

As above set forth, the discharge troughs from the separator assemblies may be connected to a common oyster meat removal trough. However, since the larger, fatter oysters will usually have their meats separated from their shucks by a different force of impact than those of the smaller, less fat oysters, it is evident that successive separators will tend to act as graders for the oysters, and each separator trough, or selected troughs may have separate outlets for this purpose.

*Embodiment of apparatus of Figures 9–11*

Figures 9–11 show a modified form of apparatus for carrying out the principles and practicing the method of this invention. In this embodiment there is disclosed a vertically extending housing or supporting framework 150 in which the shucking operation is effected, together with an oyster steamer or opener indicated generally by the numeral 152 and which supplies opened oysters to the inlet of the shucking device, together with a settling tank separator indicated generally by the numeral 154.

Figure 9 illustrates an arrangement of apparatus whereby oysters supplied to the steamer or opener 152 may be steamed and opened, may be thence delivered to the shucking machine 150, and may then be discharged to the separator 154. Since various forms of the steamer 152 and the separator 154 may be provided, it is to be understood that the form of the shucker 150 illustrated is not limited to use with the steamer and separator illustrated.

In order to more fully understand the general assembly for steaming, opening and separating oyster shells and their meat, it will be observed that the steamer 152 comprises a generally horizontally extending housing 156 having an inlet opening 158 whereby oysters may be delivered from any suitable source into the housing, and which opening may then be clamped shut. An outlet or discharge opening 160 is also capable of being clamped shut whereby oysters within the housing may be retained under pressure and steamed for opening the same. In order to effect discharge at a proper rate of the oysters from the housing 156 there is provided a horizontal conveyor element 162 of the endless type, the same having laterally projecting panels 164 which when rotated serve to convey oysters throughout the housing, from the inlet 158 to the discharge 160, and to deliver the oysters from the latter into a discharge hopper 166 at the upper end of the machine 150.

Referring now more specifically to Figures 10 and 11, it will be seen that the oyster shucking machine 150 consists of an outer, vertically extending and preferably cylindrical casing 170 within which is disposed a cylindrical grill consisting of a plurality of vertically extending parallel rods or pipes 172 which thus leave an annular space 174 between the casing and the cylindrical grating or grill.

Suitable annular ribs or rings 176 are secured to the inside surface of the cylindrical grill, to thereby rigidly unite the vertical rods 172 into a rigid cylindrical cage or grill. As will be seen from Figure 11, the rings 176 have inwardly and downwardly sloping upper surfaces and upwardly and inwardly sloping lower surfaces which constitute deflectors or baffles whereby falling oysters are directed towards the vertical center of the apparatus.

Suitable vertically extending reinforcing plates 178 are provided which serve to secure and rigidify the series of rings or ribs 176, and also join these members and the cylindrical cage to the outer cylindrical casing 170 as will be apparent from Figure 10.

Suitably journaled in the center of the concentric cylindrical cage and the cylindrical outer shell 170, is a vertically axially extending hollow shaft 180, constituting the axle of a plurality of rotor units, the upper and lower ends of the shaft having suitable journal bearings such as that indicated at 182. The lower end of the shaft rotates in a swivel bearing 184 whereby water under pressure may be supplied from any suitable source by a pipe 186 to the interior of the shaft and may then be discharged radially therefrom by means of a plurality of axially and radially spaced orifices 188, whereby the sprays of water may be projected towards the cylindrical cage at each of the rotor units.

A plurality of longitudinally or vertically spaced rotor units are provided upon the shaft 180. These consist of a series of vertically and circumferentially spaced members 190 which project radially from the shaft 180, as shown in Figures 10 and 11. These members have their outer ends terminating in closely spaced relation to the cylindrical cage or grill. Obviously any desired number of such members or rods may be provided for each of the rotor units.

In order to rotate the rotor shaft 180, the upper end of the latter is provided with a driving gear 192, which in turn is driven by a gear 194 carried by shaft 196 forming a part of the motor 198.

As so far described it will now be apparent that steamed and opened oysters supplied from the steamer 152 when discharged through the hopper 166 will be dropped by gravity through the vertical central chamber inside the cylindrical grating or grill and upon the uppermost of the rotor impact members 190. As the oysters fall downwardly through these members, they will, whenever being struck by the impact members 190, be hurled by centrifugal force and/or by the force of impact of the members 190 radially outwardly against the grill rods 172. The impact will dislodge the oyster meats which will thus pass between the bars and to the annular space 174, and drop to the bottom of the same. The shells, either emptied or with any meat remaining therein will be dropped downwardly through the device, receiving repeated and successive impacts. Any meat separated in any particular impact by any particular rotor or impact member, will of course be immediately extracted when the same strikes the cylindrical cage.

The lower portion of the annular chamber 174 between the cylindrical grill and the cylindrical shell 170, and the cylindrical inner chamber within the cylindrical grill is open, whereby the meats dropping through the annular chamber 174 and the shells dropping from the cylindrical chamber within the grill will fall into a water tank disposed in the separator 154. The shells will drop by gravity to the bottom of the tank, and will be withdrawn therefrom by a conveyor 201 for discharge to any suitable location. The oyster meats, floating upon the surface of the liquid in the tank, will pass towards the left thereof, such fluid being induced as by spray or the like, and will be lifted by the conveyor 203 to any suitable place of use or further treatment.

In this form of the apparatus, it will be apparent that during the fall of the oysters by gravity through the vertical shucking tunnel, passage or chamber of the device, the oysters are repeatedly driven by blows from the impact members 190 of the rotors radially outwardly of the chamber or transversely of the direction of their travel through the chamber, into contact with the separating grating which surrounds this chamber. Thus, as soon as the meat is extracted from the shell, the meat will be immediately separated from the shell by passing of meat through the cylindrical grating 172, so that the meat will no longer be subjected to further contact with the shell or with the impact members, thereby protecting the meat from damage which might result from the same.

*Embodiment of apparatus of Figures 13, 14*

In Figures 13 and 14 a third embodiment of shucking machine is disclosed. The apparatus of Figures 1–8 requires the least floor area but has the greatest height, the arrangement of Figures 9–11 requires more floor area but necessitates less height, while that of Figures 13, 14 requires the greatest floor area but has the least height.

In this last embodiment, there is provided a cylindrical casing or tank 200, having a conical bottom 202 provided with a motor chamber 204 therebeneath. The upper end of the tank is preferably open for receiving in any desired manner steamed and opened oysters suitable for shucking.

Journaled axially in the tank as by bearing means such as that at 206 is a vertical axle 208. Secured to the top thereof is a conical downwardly inclined shield 210 having radially outwardly projecting horizontal or downwardly sloping fingers 212 at its periphery, these fingers terminating at any desired distance, from the wall of the tank.

Carried by the wall of the tank below the fingers 212 are a circumferentially spaced set of inwardly and downwardly directed rods 214 having their lower ends disposed adjacent the axle 208 and constituting a separator or grating. A conical shield 216 extends from the tank wall upwardly, terminating at its apex closely adjacent the axle 208 and beneath the rods 214. A circumferential trough 218 is mounted upon the exterior of the tank and communicates with its interior just above the lower edge of the shield 216 by arcuate openings 220. The trough has a discharge spout 222 by which it discharges into a delivery conduit 224.

Adjacent the open upper end of the tank a circular water spray manifold 226 is secured by brackets 228 for spraying water upon the shield 210, the rods 214 and the shield 216.

The above described mechanism constitutes a single unit for shucking the oysters and separating the shells and meats. Any desired number of such units may be disposed in the tank 200 in vertical alignment, for successively shucking and separating the oysters, two such units being shown for convenience of illustration in Figure 13.

Thus, the lower unit includes the rotary shield 230 identical to the shield 210 and fixed to the axle 208, there being also provided the separator grating rods 232, the stationary shield 234, circumferential trough 236, openings 238, spray manifold 240, all as in the upper unit.

In the housing 204, the lower end of the axle 208 is journaled in the gear casing 242, driven as by a motor 244. Obviously, any desired driving may be provided for rotating the shaft 208 and the rotary shields 210 and 230 at any selected speed. The operation of this embodiment is as follows.

Oysters after being opened by steaming are fed into the open upper end of the tank, dropping upon the rotating conical shield 210. The impact or jar to the oysters as they strike this surface will dislodge the meat from some of the opened shells. The shells and meat aided by the cleansing and lubricating sprays from the manifold 226 will slide by gravity and for centrifugal force off the edge of the shield and the fingers 212 from whence they will drop onto the separator grating rods 214. The meats already dislodged from the shells will pass through the fingers 212 and through the rods 214, being collected upon the stationary shield 216 from whence, aided by the lubricating water, they will collect in the trough 218 and be carried by the water into the conduit 224.

The emptied shells, and those still containing meat, will drop from the ends of the grating rods 214 upon the rotary shield of the next lower unit where the above described shucking and separating operation will be repeated. These operations will be repeated until the oyster shells pass through each of the units, finally emerging from the lowermost unit through tank wall openings 238 where they will be removed by any desired means, not shown.

As in the embodiment of Figures 1–8 in particular, and in that of Figures 9–11 to some extent, the meats will be separated from the shells as soon as they are dislodged therefrom, thereby preventing damaging of the meats by the shells, such as would necessarily ensue upon passage of the commingled meats and shells through the entire machine. To some extent, at least, the immediate separation of meats from the shells as soon as the former are dislodged from the latter will effect a sorting or grading of the oyster meats at the troughs 218, 236 of each unit which may be utilized to obtain oyster meats of different grades.

*Method of shucking oysters*

The invention set forth herein involves a novel method of shucking oysters or for shucking and grading oysters which can be practiced by each of the foregoing embodiments of apparatus, but which also is not limited thereto.

In each of the constructions disclosed herein, the method is practiced by causing oysters to flow downwardly, under the influence of gravity, through the shucking mechanism. In its broader aspects, however, the method is nowise dependent upon or limited to a downward travel of the oysters, nor to gravity for effecting travel of the oysters.

Instead in its broadest scope, this method primarily consists of a first step of effecting or causing a substantially continuance, if somewhat intermittent, non-reversing or unidirectional progress of the oysters along a path of travel past a plurality of stations or zones; a second step in which at each station or zone impacts are given the oysters to effect a zig-zag or lateral, traversing movement of the oysters across the path of travel, the impacts and the reversing of the lateral or traversing moving effecting progressively more complete dislodgement of the meat from the shells; and a third step of separating the dislodged meat from the shells at each reversal of the lateral or traversing movement and removing the meats from further progress along the path of travel.

In the constructions disclosed herein the first step is performed by allowing the oysters to travel, fall or flow along a vertical path of travel under the influence of gravity. However, this step can also be performed by moving the oysters by any suitable means such as upon a belt or by projecting the same along paths which are horizontal or inclined upwardly or downwardly from the horizontal.

The second step may be performed not only by the substantially horizontally directed impacts or impulses of the various impact members of the three constructions illustrated, but by any means such as stationary deflectors or baffles or other agents which are caapble of imparting an abrupt movement to the oysters which is transverse to or across their path of travel, whereby the inertia or jar of the impact upon the oyster at either end of its traversing travel will cause dislodgement of the meat from the shells.

The three basic or primary steps of this method may also be accompanied by any of such important but subordinate steps as varying the speed of travel of the oysters along their path of travel; varying the force, speed or number and direction of the impacts effecting their traversing movement; sorting or grading the oysters by segregating the meats separated at each reversing transverse movement or impact; agitating any or all of the separator gratings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An oyster shucking machine comprising means defining a conveyor passage for the oysters to be shucked, means operatively associated with said conveyor passage means for delivering oysters thereto, rotatable impact means in said conveyor passage means for forcefully engaging said oysters to strike the shells and dislodge the meat therefrom and separating means associated with said conveyor passage means for separating and removing said meats from said shells.

2. The combination of claim 1 wherein said rotary impact means comprises a plurality of rotary impact devices spaced longitudinally of said conveyor passage for successively striking oysters progressing through said passage.

3. The combination of claim 1 wherein said rotary impact means comprises a plurality of rotary impact devices spaced longitudinally of said conveyor passage for successively striking oysters progressing through said passage, said separating means comprising a plurality of separators, each of the latter being disposed adjacent one of said impact devices for receiving oysters struck by the latter.

4. The combination of claim 1 wherein said conveyor passage means is disposed in a vertical position whereby oysters will pass therethrough under the influence of gravity.

5. The combination of claim 1 wherein said rotary impact means forcibly directs oysters transversely of said conveyor passage without reversing the direction of travel of the oysters along said conveyor passage.

6. The combination of claim 1 wherein said conveyor passage means includes a vertically extending chute through which said oysters fall under the influence of gravity, said rotary impact means causing movement of the falling oysters transverse their path of fall.

7. The combination of claim 1 wherein said conveyor passage means includes a vertically extending chute through which said oysters fall under the influence of gravity, said rotary impact means causing movement of the falling oysters transverse their path of fall, said rotary impact means being disposed adjacent one side of said chute, deflector means mounted on said chute adjacent said rotary impact means for directing falling oysters upon the latter.

8. The combination of claim 1 wherein said conveyor passage means includes a vertically extending chute through which said oysters fall under the influence of gravity, said rotary impact means causing movement of the falling oysters transverse their path of fall, said rotary impact means being disposed adjacent one wall of said chute and said separating means being disposed on the opposite side of the chute and beneath the latter to receive oysters therefrom.

9. The combination of claim 1 wherein said conveyor passage means includes a vertically extending chute through which said oysters fall under the influence of gravity, said rotary impact means causing movement of the falling oysters transverse their path of fall, said rotary impact means being disposed adjacent one wall of said chute and said separating means being disposed on the opposite side of the chute and beneath the latter to receive oysters therefrom, said separating means including an inclined grating, means below said grating for receiving oyster meats passing through said grating and removing said meats laterally from said chute.

10. The combination of claim 1 wherein said separating means includes a grating across which the oyster shells pass and through which the oyster meats fall, means below said grating for removing the oyster meats passing therethrough.

11. The combination of claim 10 including means operatively connected to said grating for imparting vibratory movement to the latter to thereby facilitate passage of oyster meats therethrough.

12. The combination of claim 1 wherein said rotary impact means comprises a plurality of rotary impact devices spaced longitudinally of said conveyor passage for successively striking oysters progressing through said passage, at least one of said impact means operating at a different speed of rotation from that of the other impact means.

13. The combination of claim 1 wherein said rotary impact means comprises a plurality of rotary impact devices spaced longitudinally of said conveyor passage for successively striking oysters progressing through said passage, at least one of said impact means is of different size from that of the other impact means.

14. The combination of claim 1 including means for spraying water against said impact means for cleaning the same and facilitate removal of oyster meats from their shells.

15. The combination of claim 1 including deflector means mounted upon the interior of said conveyor passage and each positioned upon the approach side of an impact means for directing towards the latter oysters moving through said conveyor passage.

16. The combination of claim 15 including means for spraying water against said impact means for cleaning the same and facilitate removal of oyster meats from their shells, said spraying means being mounted in said conveyor adjacent said deflector means and on the downstream side thereof.

17. The combination of claim 1 wherein said rotary impact means includes an elongated member having a longitudinal axis, means in said conveyor passage mounting said elongated member for rotation about an axis of rotation that is parallel to said longitudinal axis and for movement by said elongated member across the path of travel of said oysters whereby to strike oysters and cause them to move laterally of their path of travel.

18. The combination of claim 17 including means to vary the position of mounting of said elongated member whereby to adjustably control the lateral movement imparted thereby to said oysters.

19. The combination of claim 1 wherein said rotary impact means includes a reel, said reel including a plurality of elongated members disposed in parallel rotation about a common axis of rotation, means mounting said reel in said conveyor passage with its axis of rotation extending transversely of said passage whereby said members will be moved by rotation of said reel across the path of travel of oysters through said conveyor passage and impart lateral movement to said oysters.

20. The combination of claim 1 wherein said rotary impact means includes a reel, said reel including a plurality of elongated members disposed in parallel rotation about a common axis of rotation, means mounting said reel in said conveyor passage with its axis of rotation extending transversely of said passage whereby said members will be moved by rotation of said reel across the path of travel of oysters through said conveyor passage and impart lateral movement to said oysters, said elongated members comprising blades having an adjustable angular inclination to the radii extending therefrom through said axis of rotation, whereby to vary the direction of the later movement imparted to said oysters.

References Cited in the file of this patent

UNITED STATES PATENTS

| | | |
|---|---|---|
| 2,008,820 | Doxsee et al. | July 23, 1935 |
| 2,047,688 | Jenkins | July 14, 1936 |
| 2,102,945 | Doxsee et al. | Dec. 21, 1937 |
| 2,608,716 | Harris | Sept. 2, 1952 |
| 2,652,588 | Harris | Sept. 22, 1953 |

FOREIGN PATENTS

| | | |
|---|---|---|
| 882,428 | France | Mar. 1, 1943 |